United States Patent
Deese

[11] Patent Number: 5,806,965
[45] Date of Patent: Sep. 15, 1998

[54] LED BEACON LIGHT

[75] Inventor: Raymond E. Deese, Corona, Calif.

[73] Assignee: R&M Deese, Inc., Anaheim, Calif.

[21] Appl. No.: 789,139

[22] Filed: Jan. 27, 1997

Related U.S. Application Data

[ ] Provisional application No. 60/011,141 Jan. 30, 1996.

[51] Int. Cl.$^6$ ........................................................ F21V 21/00
[52] U.S. Cl. ........................... 362/249; 362/800; 362/226; 362/237
[58] Field of Search ..................................... 362/800, 226, 362/237, 249; 313/512, 505

[56] References Cited

U.S. PATENT DOCUMENTS

| D. 304,694 | 11/1989 | Goss . | |
| 5,160,201 | 11/1992 | Wrobel | 362/249 |
| 5,278,432 | 1/1994 | Ignatius et al. | 362/800 X |
| 5,313,729 | 5/1994 | Sakai et al. | 362/240 X |
| 5,422,801 | 6/1995 | Sangalli, Jr. | 362/226 X |
| 5,457,450 | 10/1995 | Deese . | |
| 5,561,346 | 10/1996 | Byrne | 313/512 |
| 5,575,459 | 11/1996 | Anderson | 362/240 |
| 5,577,832 | 11/1996 | Lodhie | 362/249 |
| 5,585,783 | 12/1996 | Hall | 362/800 X |

FOREIGN PATENT DOCUMENTS 2069257  8/1981  United Kingdom .

Primary Examiner—Ira S. Lazarus
Assistant Examiner—David Lee
Attorney, Agent, or Firm—Knobbe, Martens, Olson & Bear, LLP

[57] ABSTRACT

An improved beacon light utilizing a plurality of LEDs. The light has a beacon portion wherein a plurality of individual LEDs are mounted on circuit boards attached together to form a substantially omnidirectional array of LEDs. The beacon portion may be constructed of upper and lower flat circular circuit boards, and a middle tubular circuit board to define a hollow cylinder. The middle circuit board is made of originally flat thin rigid circuit board material bent into a tube and attached at each free end. The middle circuit board is attached to the upper and lower rigid circuit boards using tangs extending from the middle circuit board. LEDs extend upward from the top circuit board, radially outward from the middle circuit board, and at a downward outwardly directed angle from the bottom circuit board. A base portion attached to the lower circuit board may be provided with a conventional male electrical socket member. In alternative forms, the beacon light may be spherically or conically shaped. Vent holes in the rigid circuit boards are provided for heat-dissipation. A voltage doubling circuit supplies power to the individual LEDs interconnected in both series and parallel for durability. A dome-like cover may be provided to protect the LEDs or to protect the user from injury.

18 Claims, 5 Drawing Sheets

LED BEACON LIGHT

CROSS-REFERENCE TO RELATED APPLICATION

Pursuant to 35 U.S.C. § 119(e), this application claims the priority benefit of provisional application Ser. No. 60/011,141, filed Jan. 30, 1996.

FIELD OF INVENTION

The present invention relates to durable beacon lights and, more particularly, to an LED beacon light having a multitude of individual LEDs arranged in a substantially omnidirectional pattern.

BACKGROUND OF THE INVENTION

Traffic signal lights consisting of hundreds of light emitting diodes (LEDs) are known. These LED traffic signal lights are intended to replace conventional incandescent light bulbs in ordinary traffic signals. Some of these devices can be mounted in the same housing that is currently used for the incandescent bulbs; and some designs also incorporate the same type of electrical connector so that these LED traffic signal lights can be used as plug-in replacements for incandescent bulbs.

LED traffic signal lights can be designed to produce, with normal line voltage, the same light intensity as incandescent bulbs that are currently used, and to have comparable performance characteristics for different viewing angles. In addition, these LED traffic signal lights have significant advantages over incandescent bulbs. First, most LED traffic lights achieve a dramatic decrease in energy consumption. Such an LED traffic light can use as little as 15% the energy required to power an incandescent bulb, although the energy savings for different designs will vary significantly.

A second major advantage of LED traffic lights is their reliability. Typically, incandescent bulbs are replaced in traffic signals every year. In contrast, an LED traffic light normally has a useful life of approximately 15 years. Such an LED traffic signal light is shown in U.S. Pat. No. 5,457,450 which incorporates an automatic low line voltage compensating circuit. This device utilizes a particular array of LEDs mounted on a flat circuit board. Another example of an LED train beacon is shown in U.S. Design Pat. No. D304,694 to Goss. A still further example of an LED signal light is described in GB 2,069,257, which includes a circular array of lights energized in sequence to simulate a rotating light.

Additionally, LED signal lights have been utilized in indicator lights on the edges of airport runways. These LED lights are preferred for their durability and associated reliability. Such current LED beacon lights, however, are relatively complex and expensive to manufacture.

In many of these systems, the LEDs are mounted on flat, rigid printed circuit boards. Circuit board material generally comes in two types: rigid and flexible. Rigid circuit board material may be made of paper bonded with phenolic resin (i.e., fiberboard), nylon mesh, glass fiber, cloth or other matrix impregnated with epoxy resin, or other such electrically insulating material which is not expected to bend. Rigid fiberboard material is typically manufactured to minimum thicknesses of approximately 0.031 inches (31 mil), and comes in standard thicknesses of 59 mil, 92 mil, 125 mil, etc.. Some applications require multiple thin layers of rigid circuit board material laminated together to form a thick board, with the layers as thin as 0.006 inch. These thinner rigid circuit boards are not, however, used individually. Flexible printed circuits, on the other hand, are typically formed on an insulating base of polyester film, such as Mylar or other such pliable material. The flexible film is provided in thicknesses as low as 0.002 to 0.003 inches (2 mil to 3 mil) and is expected to flex, often dynamically, as does the flexible circuit tape attached to a read/write arm of a computer disk drive. These flexible films or tapes are, of course, not rigid and thus not suited for many applications requiring some structural integrity.

Accordingly, there is a need for an inexpensive and effective beacon light utilizing LEDs.

SUMMARY OF THE INVENTION

In accordance with a preferred embodiment of the present invention, a beacon light is defined by a substantially omnidirectional cluster of individual LEDs mounted to circuit boards. The LEDs are electrically connected so that failure of one does not prevent use of the others. This feature, in combination with the durability of LEDs in comparison to conventional filament-type incandescent bulbs, greatly extends the useful life of the present beacon light over prior lights. Furthermore, the same intensity of light as standard incandescent bulbs can be generated by the cluster of individual LEDs at a fraction of the power consumption.

In accordance with an important feature of the beacon light, the LEDs are mounted on a plurality of discrete circuit boards formed around a hollow interior. In this manner, initially flat circuit boards are used, some of the boards being bent into the overall three-dimensional shape of the beacon light. The individual LEDs extend outward from the respective exterior surfaces of the circuit boards, so that a plurality of LEDs project in substantially an omnidirectional array. In one particular embodiment, the light comprises upper and lower flat, circular circuit boards having LEDs mounted to extend generally upward and downward, respectively, and a central tubular circuit board having LEDs mounted to extend radially outward. The upper, lower and central circuit boards are electrically and mechanically connected together at their adjoining edges to form a hollow cylinder.

In another aspect, the present invention contemplates a beacon light capable of approximating white light from a predetermined pattern of colored LEDs mounted in a substantially omnidirectional configuration to a circuit board housing. The housing comprises a plurality of discrete circuit boards attached together electrically and mechanically to form a hollow cylinder. The cylinder may be formed by upper and lower flat portions and a central tubular portion. In one example, the LEDs are provided in a repeating pattern of 2 blue-greens, 4 yellows, and 4 red-oranges, which in combination creates light having a wavelength close to that of white light. The beacon light may have 10 clusters of the aforementioned pattern, 5 of which extend radially outward from the central tubular portion and the rest of which extend from upper and lower flat portions.

In one preferred embodiment, the invention comprises a generally cylindrically shaped beacon light in which a plurality of LEDs provide a substantially omnidirectional pattern of light. The beacon light includes an upper circular rigid circuit board having a first group of LEDs mounted thereon projecting generally upward, a lower circular rigid circuit board having a second group of LEDs mounted thereon projecting generally downward, and a middle, rigid circuit board formed into a tube and attached between the upper and lower circuit boards, the middle circuit board including a third group of LEDs mounted thereto projected generally radially outward. Circuitry is provided on the upper, middle and lower circuit boards for interconnecting the first, second and third groups of LEDs. A base connects to the lower circuit board housing electrical wires for supplying power to the circuit. A rectifier circuit converts input AC power to output DC power for the LEDs. Finally, an externally threaded male electrical socket element attaches to the base and electrically connects to the input of the rectifier circuit.

In another preferred embodiment, a generally cylindrically shaped beacon light is provided in which a plurality of LEDs provide a substantially omnidirectional pattern of light. The beacon light includes an upper circular rigid circuit board having a first group of LEDs mounted thereon projecting generally upward, a lower circular rigid circuit board having a second group of LEDs mounted thereon projecting generally downward, and a middle, rigid circuit board formed into a tube and attached between the upper and lower circuit boards, the middle circuit board including a third group of LEDs mounted thereto projected generally radially outward. A circuit on the upper, middle and lower circuit boards interconnects the first, second and third groups of LEDs.

The invention also encompasses a method for making a substantially omnidirectional pattern of light, comprising the steps of arranging a plurality of LEDs on a two-dimensional support, forming the two-dimensional support into a three-dimensional support defining a hollow interior and so that the LEDs face outward, and electrically coupling the LEDs on the three-dimensional support to a connector for supplying electricity to the LEDs and creating the omnidirectional pattern of light. The two-dimensional support may be a thin, rigid circuit board capable of being bent, and the step of forming comprises bending the circuit board into a three-dimensional shape to form the three-dimensional support. The three-dimensional shape may be a tube, a sphere or a cone. In one embodiment, the three-dimensional support is closed to substantially enclose the hollow interior, and the method further includes ventilating the interior.

DETAILED DESCRIPTION OF THE PREFERRED EMBODIMENTS

Figure 1:
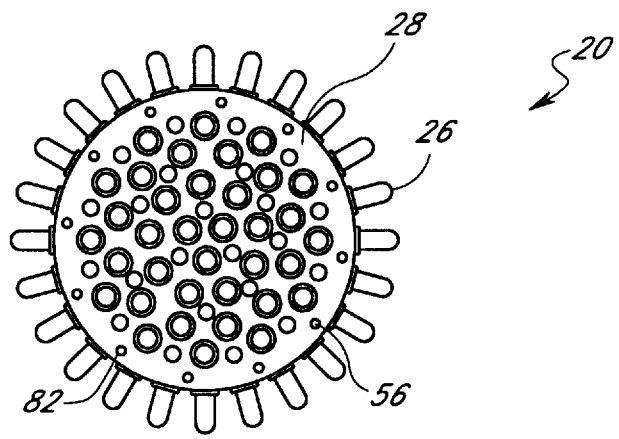
FIG. 1 is a top plan view of a three-dimensional LED beacon light of the present invention in the form of a cylinder.
Figure 2:
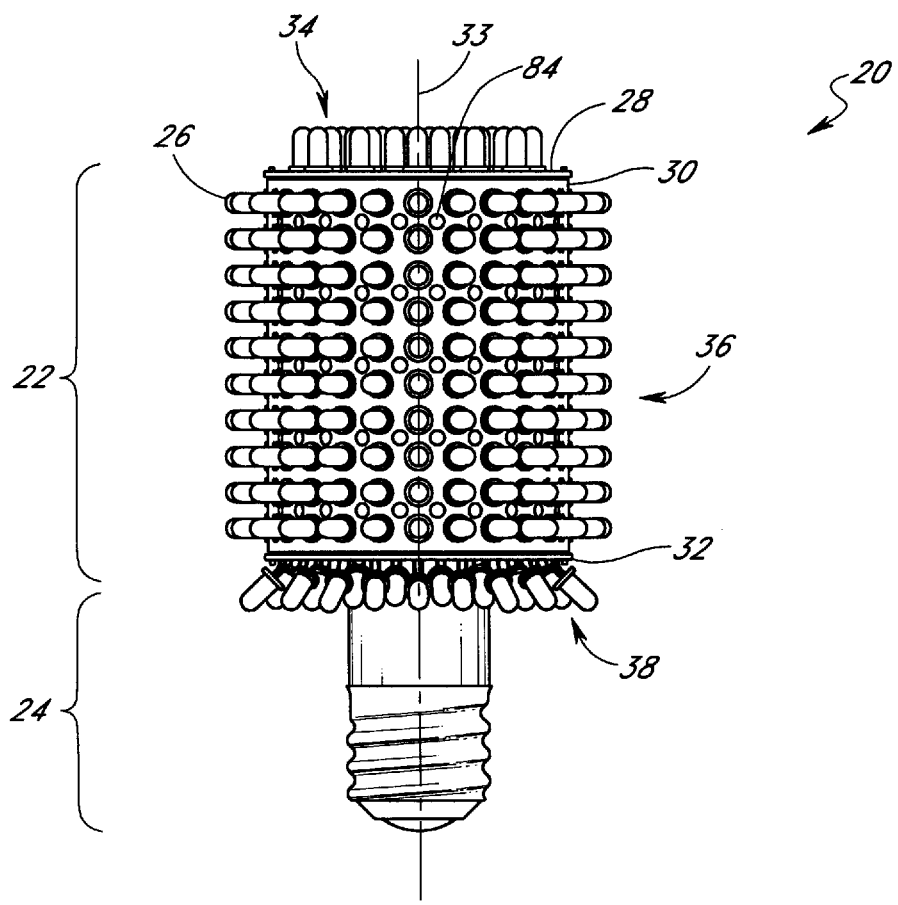
FIG. 2 is a side elevational view of the LED beacon light.

FIGS. 1 and 2 illustrate an LED beacon light 20 in accordance with the principles of the present invention. The LED beacon light 20 generally comprises an upper beacon portion 22 and a lower base portion 24. A plurality of individual LEDs 26 projects outward in a substantially omnidirectional pattern from the upper beacon portion 22.

In the preferred embodiment, the upper beacon portion 22 comprises a number of discrete circuit boards electrically and mechanically coupled together to form a hollow cylinder. The top of the cylinder is formed by an upper flat circular circuit board 28, the tubular mid-portion by a middle circuit board 30, and the bottom by a lower flat circular circuit board 32. The tubular middle circuit board 30 defines a central axis 33 for the light 20. Although the presently illustrated light 20 includes three discrete circuit boards forming a cylinder, other numbers of circuit boards may be combined to form a variety of shapes without departing from the inventive aspects herein.

The circuit boards 28, 30 and 32 provide mounting surfaces for the individual LEDs 26. The circuit boards 28, 30 and 32 are all constructed of rigid circuit board material and have electrical connections for the various LEDs 26 incorporated therein. As is well known in the art, standard LEDs 26 each include two conductive prongs extending in the opposite direction from the illuminated end, these prongs extending through holes drilled in the various circuit boards to be soldered therein. One type of LED 26 suitable for use in the present invention is made by Hewlett Packard with a wattage rating of 4, 6 or 8 W. Alternatively, a one-sided soldered swage connection may be utilized. In a further option, surface-mounted LEDs can be used which enables the use of automated pick and place assembly devices.

Figure 10:
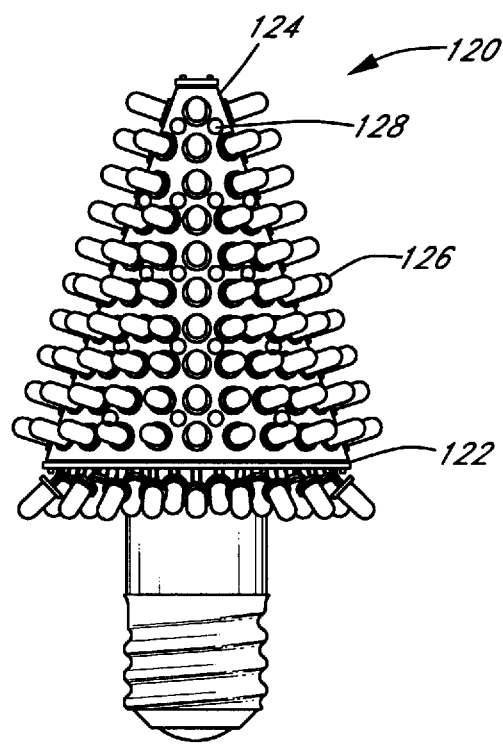
FIG. 10 is a side elevational view of a cone-shaped LED beacon light in accordance with the present invention.

The upper beacon portion 22 includes a first plurality of LEDs 34 mounted to the upper circuit board 28 and facing directly upward, a second plurality of LEDs 36 mounted to the middle circuit board 30 and directed radially outward from the central axis 33, and a third plurality of LEDs 38 mounted to the lower circuit board 32 and angled downward and outward from the axis of the beacon light 20. The combination of the first, second and third pluralities of LEDs, 34, 36 and 38, provide light in a 360° radial pattern as well as directed upward and downward from the light 20. This substantially omnidirectional array of LEDs is well suited for beacon lights on the tops of buildings, on trains, or ships, or for placement on the edge of airport runways, among other uses. Of course, as mentioned above, the arrangement of LEDs 26 around the beacon light 20 may be modified to include more or less as desired, the presently illustrated embodiment being merely for example. For example, a spherical arrangement of the circuit boards and associated LEDs producing a more complete omnidirectional array of illumination is possible, although the complexity and cost of such a light makes the present simple to manufacture design preferable for most situations. An alternative cone-shaped light 120 is seen in FIG. 10 and described below.

Figure 3:
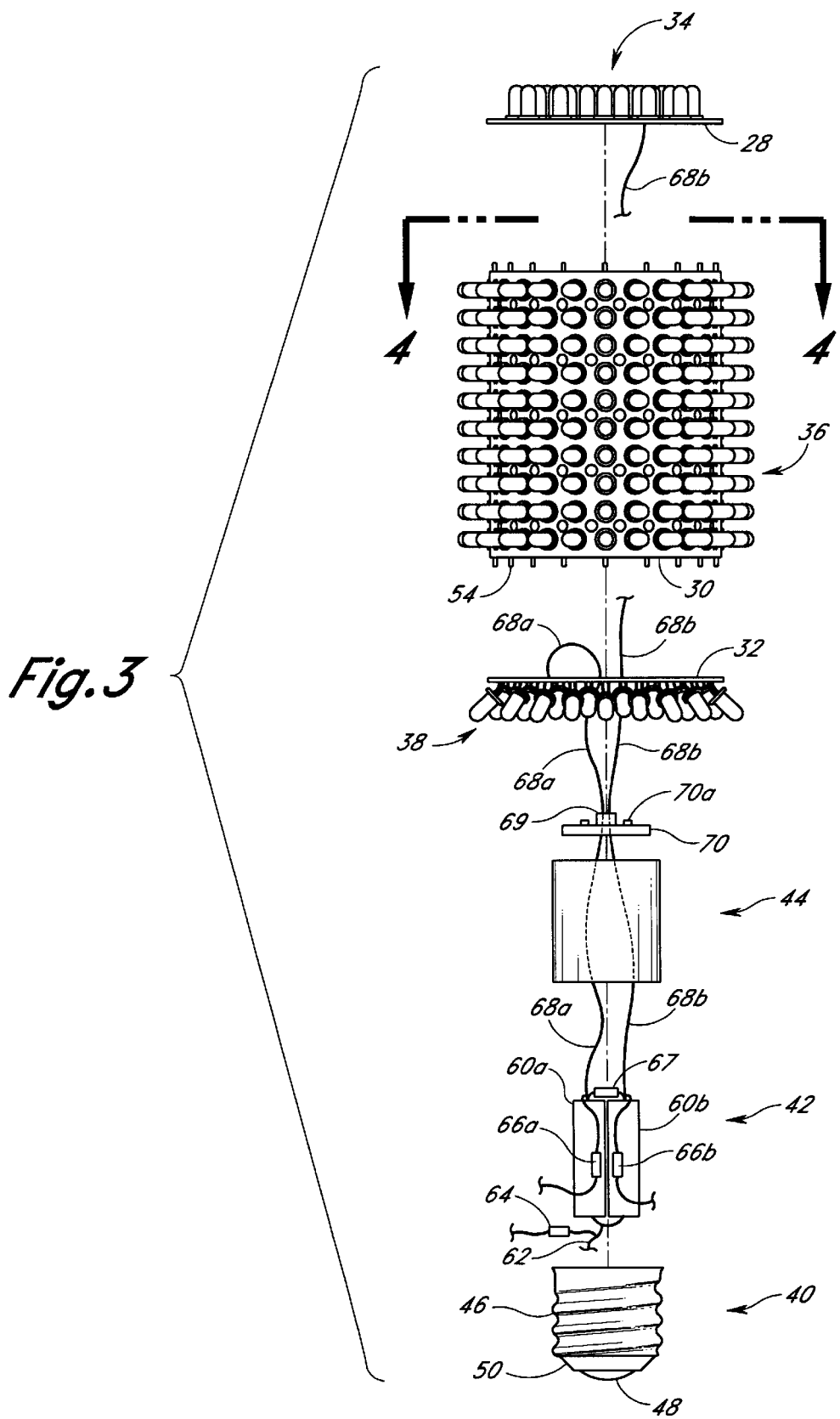
FIG. 3 is an exploded elevational view of the LED beacon light.

The base portion 24, as best seen in FIG. 3, includes a lower conducting member 40, an internal circuit assembly 42 and a tubular housing 44 enclosing the circuit assembly 42 and providing a spacer between the lower circuit board 32 and the conducting member 40. Preferably, the conducting member 40 is a conventional threaded male electrical socket element currently used in standard incandescent light fixtures. In this regard, the conducting member 40 includes an outer threaded conducting wall 46 terminating in a lower conductive pole 48. The conducting wall 46 conducts electricity and is insulated from the pole 48 by an insulating region 50. As seen in FIG. 2, the assembled LED beacon light can thus be screwed into a conventional female electrical socket, the light being preferably powered by standard wall current of 120 VAC. Other arrangements for supplying power to the LED beacon light 20 are contemplated. For example, the LED beacon light 20 may be adapted to be hard wired into an electric grid, or may include a different electrical coupling than that shown. The provision of the standard conducting member 40, however, enables the present LED beacon light 20 to be retrofit into existing light fixtures without modification.

An important feature of the present invention is the mounting of the individual LEDs 26 on rigid circuit board material. The term "rigid" circuit board, in the present application, is distinguished from flexible tape as the substrate material. As mentioned in the background discussion, rigid circuit board material is typically manufactured to minimum thicknesses of approximately 0.031 inches (31 mil) and at that thickness is not expected to bend. Rigid circuit board material at that thickness is thus not suited for forming the tubular middle circuit board 30. This "rigid" material, however, can be provided in thinner sheets to allow for some bending. The thinner sheets remain "rigid" relative to flexible tape. Such tape will easily conform to a variety of shapes, including tubes, but has insufficient structural integrity to adequately support any weight of the upper circuit board 28, or maintain itself in the desired three-dimensional configuration.

In the present LED beacon light 20, the upper and lower circuit boards 28, 32 are made of conventional rigid circuit board having a thickness of at least 0.031 inch. The material may be of a variety of monolithic materials or laminates, but is preferably a commercial grade of fiberboard. The upper and lower circuit boards 28, 32 include drilled holes for receiving the pairs of electrical prongs extending from each of the individual LEDs 26, which are then affixed therein with solder from the back side of the circuit boards. A conventional printed pattern of conductive material connects the soldered prongs on the back side of the circuit boards 28, 32 in a predetermined arrangement for providing power to each of the LEDs 26. Various techniques for producing such printed circuit arrangements are well known in the art and will not be described further herein.

Figure 4:
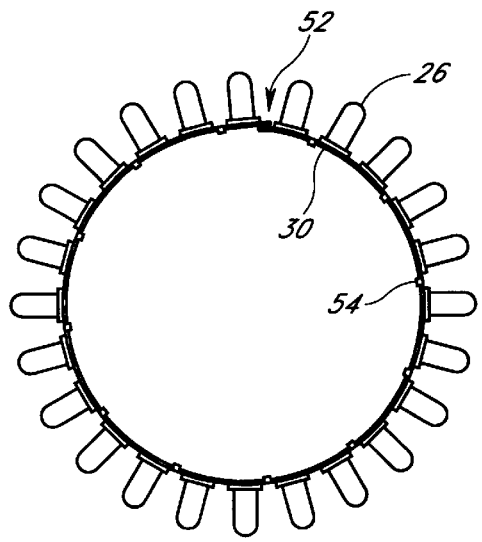
FIG. 4 is a top plan view of a tubular circuit board forming a middle portion of the LED beacon light taken along line 4—4 of FIG. 3.

The middle circuit board 30, on the other hand, is made of rigid circuit board material having a thickness of approximately 0.010 inch (10 mil). Manufacturing the circuit board at this thickness allows the board to be fabricated in flat strips, yet be easily bent into the tubular shape, as seen in FIG. 4. The two free ends overlap at 52 and are connected together, such as with solder. Although thinner than typical rigid circuit boards, this construction provides a suitable rigid support for the upper circuit board 28. Moreover, the tubular shape enhances the column strength of the thin board and the interconnection with the upper and lower circuit boards 28, 32 described below further strengthens the assembly. The resulting rigid hollow cylinder formed thereby is sufficiently stable even in environments subjected to shock and/or vibration. In other words, the integrity of the mechanical and electrical connections between the components will not be compromised from relative movement therebetween, such as would be the case if constructed using a flexible tape, and thus the light 20 is quite durable.

The thin rigid board comprising the middle circuit board 30 also includes drilled holes for receiving the pairs of electrical prongs extending from each of the individual LEDs 26 in the array 36, which are then affixed therein with solder on the rear or inner side of the circuit board 30. As with the upper and lower circuit boards 28, 32, a conventional printed pattern of conductive material connects the soldered prongs on the inner side of the circuit board 30 in a predetermined arrangement for providing power to each of the LEDs 26.

The upper and lower circular edges of the middle circuit board 30 are provided with a plurality of evenly spaced tangs 54, as seen in FIG. 3. These tangs 54 extend through a circular series of through holes 56 provided in the periphery of both the upper and lower circuit boards 28, 32. These through holes 56 are seen in the upper circuit board 28 in FIG. 1. The tangs are then joined rigidly into the through holes 56 with the use of solder, for example. Additionally, the tangs 54 provide for electrical continuity between the upper, middle and lower circuit boards 28, 30 and 32. In this regard, the printed circuit layers formed on the rear or inner side of the middle circuit board 30 are in electrical communication with the tangs 54, and a peripheral circular conductive region is provided on both the upper and lower circuit boards 28, 32 at the same diameter as the circular array of through holes 56.

Figure 5:
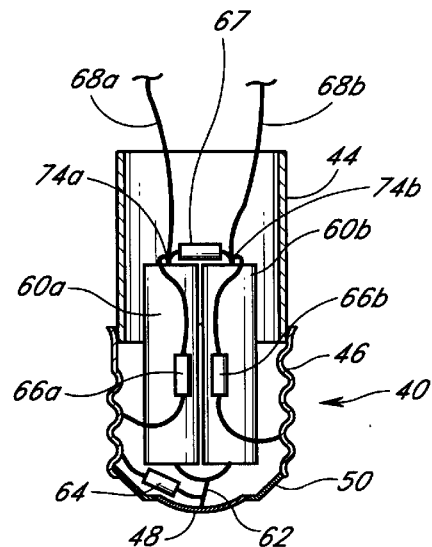
FIG. 5 is a partial sectional view taken through a base portion of the LED beacon light.

The particular power supply configuration for the LED beacon light 20 will now be described. As seen in FIGS. 3 and 5, the circuit assembly 42 comprises a pair of high voltage capacitors 60a, 60b which are firmly attached at their lower ends within the conductive member 40. The pair of capacitors 60a, 60b is thus positioned centrally within the conductive member 40 and extends upward within the tubular sleeve 44. Both of the capacitors 60a, 60b are in electrical communication with the conductive pole 48 at their lower ends. In this regard, a small amount of solder or other such conductive material is typically used to electrically and mechanically join the lower ends of the capacitors 60a, 60b and the upper surface of the conductive pole 48. For illustrative purposes, however, this solid connection is shown schematically in the figures as the common electrical connection 62.

A first resistor 64 is electrically connected between the conductive pole 48 and the conducting wall 46. A second resistor 67 electrically bridges the upper ends of the capacitors 60a, 60b. A first high voltage rectifier diode 66a is electrically connected between the upper end of the first capacitor 68 and the outer conducting wall 46. Likewise, a second high voltage rectifier diode 66b is electrically connected between the upper end of the second capacitor 60b and the outer conducting wall 46.

As indicated in FIG. 3, a pair of power leads 68a and 68b extend upward from the respective upper ends of the capacitors 66a, 66b through the tubular sleeve 44 and the lower circuit board 32 into the hollow space within the upper beacon portion 22. The leads 68a,b pass through individual apertures in a fitting 69 provided in a disk-shaped cap 70, the cap sized to rigidly fasten in the top of the tubular sleeve 44 with adhesive, or other such means. Although not shown, the fitting 69 projects upward through a central hole in the lower circuit board 32. A plurality, preferably three, projections 70a in the top surface of the cap 70 extend through holes in the lower circuit board 32 and are used to rigidly fix the cap to thereto. In this regard, the projections 70a are desirably plastic whose upper ends are melted and flattened after passing through the lower circuit board 32.

The first power lead 68a terminates on the upper surface of the lower circuit board 32, and is soldered into electrical connection with the printed circuit formed thereon. The second power lead 68b extends upward within the tubular middle circuit board 30 and is electrically attached to the underside of the upper circuit board 28. The power leads 68a, 68b thus provide opposite poles for the beacon portion 22.

Figure 6:
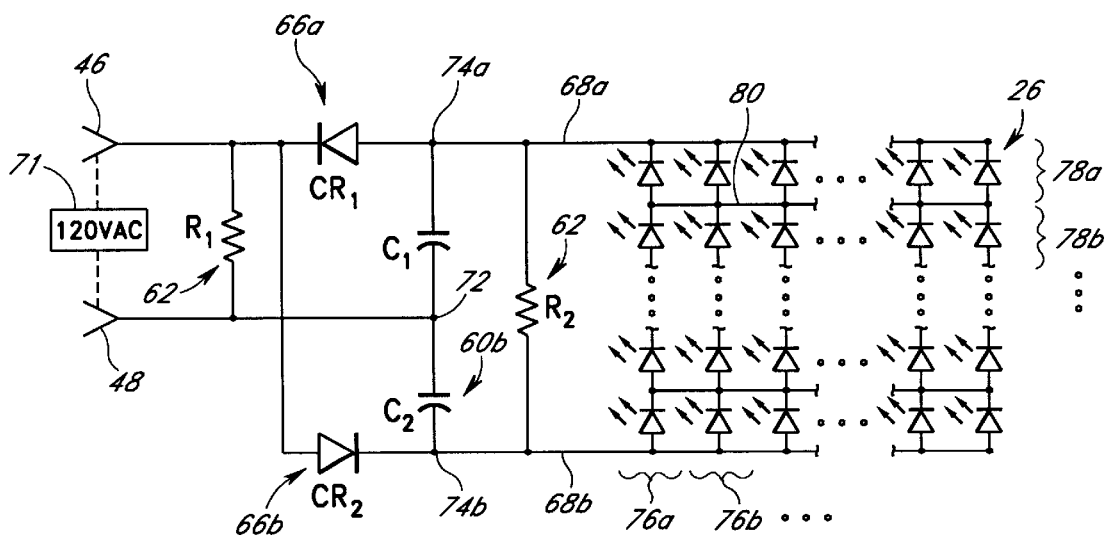
FIG. 6 is an electrical circuit diagram of the LED beacon light.

FIG. 6 schematically illustrates the circuit of the present LED beacon light 20. A power source 71 provides input power across the outer conducting wall 46 and the conductive pole 48. The first resistor 62 having a value $R_1$ is connected between the two power source poles defined by the wall 46 and pole 48. A node 72 between the two capacitors 60a and 60b is directly connected to one end of the first resistor 62 and to the conductive pole 48. The capacitors 60a, 60b have values $C_1$ and $C_2$, respectively. The second resistor 67, having a value $R_2$, bridges the ends of the capacitors 60a, 60b opposite the node 72. In this regard, the first capacitor 60a has an upper node 74a, and the second capacitor 60b has an upper node 74b; the "upper" designation referring to the position shown in FIG. 5. The first rectifier diode 66a attaches between the first upper node 74a and the conducting wall 46. The first rectifier diode 66a has a threshold voltage indicated by the symbol $CR_1$. The second rectifier diode 66b extends between the second upper node 74b and the conducting wall 46. The second rectifier diode 66b has a threshold voltage $CR_2$.

The circuit 42 thus formed converts an input AC voltage from the source 71 into a DC voltage for the light 20. Additionally, the circuit 42 doubles the input voltage through the placement of the resistors, capacitors and diodes. More specifically, the AC voltage from the source 71 alternately passes through only one of the rectifier diodes 66a,b to charge one of the capacitors 60a or 60b. The resistors 62 and 67 prevent the capacitors 60a,b from discharging quickly, and thus each are continually recharged in alternating half cycles. The results is a potential across the upper nodes 74a,b which is equal to twice the peak voltage of the input source 71. In a typical situation, the source 71 has a 120 VAC input signal, and the resulting potential across the upper nodes 74a,b is approximately 240 VDC. Of course, some loss may occur as the capacitors 60a,b instantaneously discharge, and the potential across the upper nodes 74a,b may be decreased to about 220 VDC.

Shown on the right in FIG. 6, the plurality of individual LEDs 26 are arranged in a grid schematically shown as a plurality of interconnected columns extending in parallel across the first and second upper nodes 74a, 74b. More specifically, a first column 76a of LEDs 26 extends in series between the nodes 74a,b. Likewise, a second column 76b of LEDs 26 extends in series between the nodes 74a,b. A multitude of columns of LEDs is thus connected between the powered nodes 74a, 74b. The LEDs 26 are further arranged in rows, indicated by 78a, 78b, etc., which are determined by a plurality of cross-connector leads 80. The leads 80 each extend from points between two LEDs 26 in one column 76, to corresponding points between two LEDs 26 in the adjacent column(s) 76. The resulting network of LEDs 26 increases the durability of the LED beacon light 20. In other words, if any single LED 26 in one of the columns fails, the electrical path bypasses that faulty LED using the cross-connector leads 80 to the adjacent column(s), and thereafter jumps back to the original column in which the faulty LED is located using a second cross-connector lead 80.

The color generated by the beacon light 20 can be varied depending on the pattern of LEDs 26 used. Obviously, an all red pattern of LEDs will produce a red light. Other colors and combinations thereof can be easily produced by various patterns of the individual LEDs 26. It is well-known that combinations of different wavelengths can be used to produce white light. White light is desirable for street lights and other similar applications and can be created by a particular sequence of different colored LEDs. In one particular sequence, clusters of 2 blue-green, 4 yellow, and 4 red-orange LEDs are distributed evenly about the beacon light 20 to simulate white light. In one distribution, five clusters of this pattern of 10 LEDs are mounted around the tubular middle circuit board 30, three clusters are mounted projecting from the upper circuit board 28, and two clusters mounted projecting from the lower circuit board 32. Other sequences are possible to create, for example, a pinkish white light to simulate a monochromatic spectrum closer to the light from a fluorescent bulb.

The beacon light 20 and associated LEDs 26 generate a substantial amount of heat in operation. Consequently, the circuit boards 28, 30 and 32, preferably include a plurality of vents or small holes for releasing heat trapped in the hollow interior of the light 20. These holes can be circular or other shapes, and preferably pre-drilled into the circuit board before forming into the three dimensional light 20. In the illustrated example, a plurality of such holes 82 are provided in the upper circuit board 28 between LEDs 26. A plurality of holes 84 are also provided in the middle circuit board 30. Additionally, although not shown, a plurality of holes may be provided in the lower circuit board 32. The number of holes varies depending on the number of LEDs, and their respective heat generating capacity (which partly depends on the color of the LEDs). In one embodiment, the vent holes are 0.100 inch in diameter.

The holes 82 in the middle circuit board 30 are preferably spaced in such a way so that the structural integrity of the tubular portion is retained. More particularly, as seen in FIG. 1, vent holes 84 are provided in some of the diagonal spaces between 4 adjacent LEDs 26. The holes 84 are located in every other intermediate row between horizontal rows of LEDs 26, beginning with the first intermediate row at each end. One hole is provided in these intermediate rows per intermediate column between vertical rows of LEDs 26. Therefore, some of the intermediate rows between the horizontal rows of holes 84 are left solid. This ensures that there is sufficient material along any one vertical intermediate row to withstand the bending stresses imposed on the circuit board material when rolled into a tubular shape. In one particular embodiment, in the middle circuit board 30 there are ten horizontal rows of twenty-three LEDs (230 LEDs) and twenty-three vent holes 84 are formed in 5 intermediate rows (115 holes). Anywhere from nine to twenty holes 82 are formed in the upper circuit board 28, and between eight and sixteen in the lower circuit board 32. The placement of the holes in the flat upper and lower circuit boards 28, 32 is not as important as in the middle board 30, but preferably they are relatively evenly distributed. Of course, those of skill in the art will recognize other variations on the vent hole placement to ensure structural integrity and provide sufficient cooling capacity.

Figure 8:
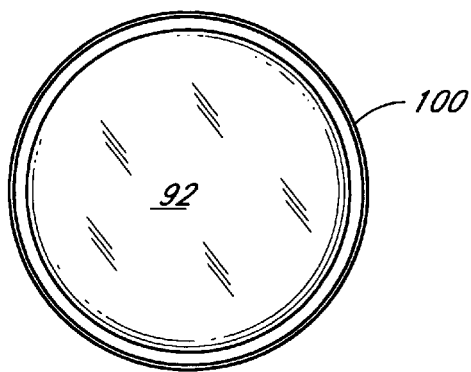
FIG. 8 is a top plan view of the LED beacon light of FIG. 7.
Figure 7:
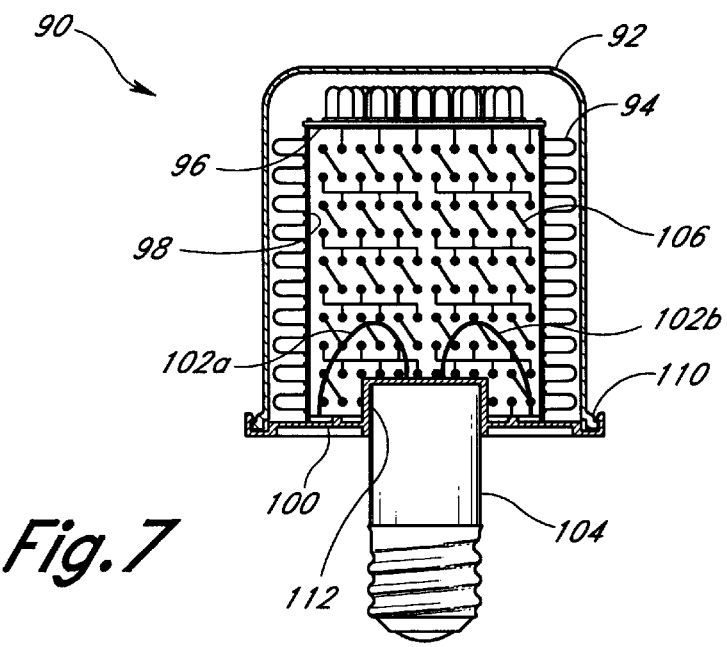
FIG. 7 is a vertical section through an alternative LED beacon light having an outer cover.
Figure 9:
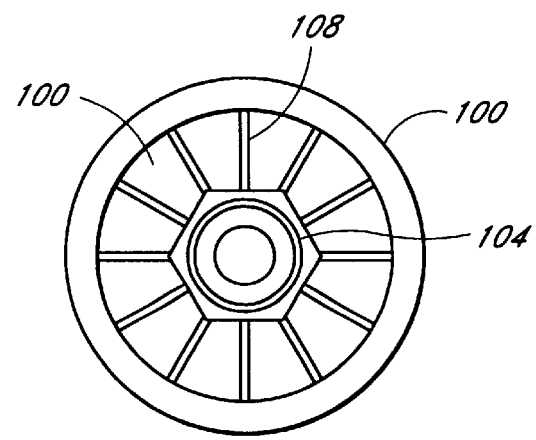
FIG. 9 is a bottom plan view of the LED beacon light of FIG. 7.

In an alternative embodiment shown in FIGS. 7–9, a beacon light 90 includes an outer protective dome-like cover 92. The cover 92 both protects the LEDs 94 from exposure to the elements but also protects the consumer from the electrical circuitry within. Furthermore, although preferably transparent or diffuse white in nature, the cover 92 may comprise some type of special lens, such as a fragmented, colored, or otherwise translucent lens.

The alternative light 90 comprises an upper circuit board 96 and a tubular middle circuit board 98, with a lower board 100 defining the bottom wall of a hollow cylinder. The lower board 100 may include circuitry printed thereon, but desirably simply defines a lower wall for the cylinder. A pair of electric leads 102a, 102b extending upward from a base portion 104 both terminate at the lower board 100, or at the lower portion of the tubular middle circuit board 98.

Alternatively, one of the leads 102a or 102b may be electrically connected to the upper circuit board 96, as in the earlier-described embodiment. In a departure from the previous embodiment, the circuit defined by the printed layers on the interior of the boards 96 and 98 can be arranged to conduct power from one lead 102a to another 102b through all of the LEDs 94 without connecting one of the leads to the upper circuit board 96. One small portion of the circuit formed on the inner surface of middle circuit board 98 is seen at 106. It will be apparent that there are no LEDs mounted to the lower board 100 for simplicity of design, although a secondary circuit board having downward-facing LEDs could be provided within the cover 92. The lower board 100 may be formed of plastic and reinforced with a plurality of radially directed ribs 108. Preferably, the cover 92 snaps or is otherwise securely fastened into an upwardly opening peripheral channel 110 formed in the lower board 100. Also, the lower board 100 defines a central cylindrical cavity 112 for receiving and affixing the base portion 104.

FIG. 10 illustrates a still further embodiment of a beacon light 120 formed in the shape of a cone. In this embodiment, a lower circuit board 122 supports an upper conical circuit board 124. The upper conical circuit board 124 is initially formed flat in the shape of a truncated triangle. Opposed side edges are then brought together forming the cone. In this arrangement, none of the LEDs 126 project directly upward, but nevertheless the coverage of the LEDs surrounding the cone-shaped light 120 such that a substantially omnidirectional light pattern is produced. Vent holes 128, as described above, are provided at least in the upper conical circuit board 128.

Although this invention has been described in terms of certain preferred embodiments, other embodiments that will be apparent to those of ordinary skill in the art are intended to be within the scope of this invention. Accordingly, the scope of the invention is intended to be defined by the claims that follow.

What is claimed:

1. A generally cylindrically shaped beacon light in which a plurality of LEDs provide a substantially omnidirectional pattern of light, said beacon light comprising:
    a three-dimensional circuit board housing formed from a plurality of discrete circuit boards having attached thereto a plurality of LEDs, said boards being attached together electrically and mechanically, said circuit board housing including:
        an upper circular rigid circuit board having a first group of LEDs mounted thereon projecting generally upward;
        a lower circular rigid circuit board having a second group of LEDs mounted thereon projecting generally downward;
        a middle, rigid circuit board formed into a tube and attached to the bottom of said upper circular rigid circuit board and to the top of said lower rigid circuit board to retain said tube-shaped board between said upper and lower circuit boards, said middle circuit board including a third group of LEDs mounted thereto projected generally radially outward;
    circuitry on said upper, middle and lower circuit boards for interconnecting said first, second and third groups of LEDs;
    a base connected to said lower circuit board housing electrical wires for supplying power to said circuit;
    a rectifier circuit for converting input AC power to output DC power for said LEDs; and
    an externally threaded male electrical socket element attached to said base and electrically connected to the input of said rectifier circuit.

2. A generally cylindrically shaped beacon light in which a plurality of LEDs provide a substantially omnidirectional pattern of light, said beacon light comprising:
    a three-dimensional circuit board housing formed from a plurality of discrete circuit boards having attached thereto a plurality of LEDs, said boards being attached together electrically and mechanically, said circuit board housing including:
        an upper circular rigid circuit board having a first group of LEDs mounted thereon projecting generally upward;
        a lower circular rigid circuit board having a second group of LEDs mounted thereon projecting generally downward;
        a middle, rigid circuit board formed into a tube and attached to the bottom of said upper circular rigid circuit board and to the top of said lower rigid circuit board to retain said tube-shaped board between said upper and lower circuit boards, said middle circuit board including a third group of LEDs mounted thereto projected generally radially outward; and
        a circuit on said upper, middle and lower circuit boards for interconnecting said first, second and third groups of LEDs.

3. The LED beacon light of claim 2, wherein individual LEDs in said first, second and third groups of LEDs are multicolored and provided in sequences which in combination simulate the wavelength of white light.

4. The LED beacon light of claim 2, further including a plurality of vents provided in said middle circuit board to cool the interior of said light.

5. The LED beacon light of claim 2, wherein said upper and lower circular circuit boards are flat and are attached to upper and lower edges, respectively, of said tubular circuit board, thus forming a substantially enclosed exterior cylinder circuit board housing surrounding a hollow interior, said upper and lower circuit boards having LEDs mounted thereon and connected to said electrical circuit for contributing to said omnidirectional pattern of illumination.

6. The LED beacon light of claim 5, further including a plurality of vents provided in said circuit board housing to facilitate the release of heat from said hollow interior.

7. The LED beacon light of claim 2, wherein said middle rigid circuit board is approximately 0.010 inches thick.

8. The LED beacon light of claim 7, wherein said circuit comprises a network of LEDs connected in parallel and in series to ensure a power supply bypass to LEDs adjacent a failed LED in the network.

9. The LED beacon light of claim 7, further including providing a durable network of LEDs by electrically coupling adjacent LEDs on said three-dimensional support and on said two-dimensional support in both parallel and in series to ensure a power supply bypass to LEDs adjacent a failed LED in the network.

10. The LED beacon light of claim 2, further including a base portion connected to said lower circuit board housing electrical wires for supplying power to said circuit.

11. The LED beacon light of claim 10, wherein said base portion includes an externally threaded male electrical socket element.

12. The LED beacon light of claim 10, wherein said base portion includes a rectifier circuit for converting input AC power to output DC power for said LEDs.

13. The method for making a substantially omnidirectional beacon light, comprising the steps of:
    attaching a plurality of LEDs to a first circular-shaped circuit board;

attaching a plurality of LEDs to a second circular-shaped circuit board;

attaching a plurality of LEDs to a third thin, rigid circuit board capable of being bent;

bending said third circuit into a hollow cylinder circuit board;

providing the upper and lower circular edges of said hollow cylinder circuit board with a plurality of spaced tangs;

providing a circular series of through holes in the periphery of the first and second circular-shaped circuit boards;

joining said first, second and third circuit boards to form a three-dimensional circuit board housing supporting a plurality of LEDs by locating the tangs at one end of said hollow cylinder circuit boards into through holes of said first circular-shaped circuit board; and locating the tangs at the opposite end of said hollow cylinder circuit board into through holes of said second circular-shaped circuit board;

so as to provide a light field covering a substantial portion of the exterior of said three-dimensional circuit board housing; and electrically coupling the LEDs on said three-dimensional circuit board housing to an electrical socket.

14. The method of claim 13, further including converting input AC power to output DC power for said LEDs.

15. The method for making a substantially omnidirectional pattern of light, comprising the steps of:

attaching a plurality of LEDs on a plurality of discrete circuit boards;

attaching together said plurality of discrete circuit boards to form a three-dimensional support circuit board housing defining a hollow interior and having said LEDs facing outwardly; and electrically coupling the LEDs on said three-dimensional circuit board housing to a connector for supplying electricity to said LEDs and creating said omnidirectional pattern of light.

16. The method of claim 15, wherein said three-dimensional support is closed to substantially enclose said hollow interior, and said method further includes ventilating said interior.

17. The method of claim 15, wherein at least one of said discrete circuit boards is a thin, rigid circuit board capable of being bent, and including the step of bending said circuit board into a three-dimensional shape.

18. The method of claim 17, wherein said three-dimensional shape is a tube and said method further includes connecting second and third of said discrete circuit boards to opposite open ends of said tube.

* * * * *